Aug. 11, 1931.  E. SAVY  1,818,911

MACHINE FOR COATING AND GLAZING BISCUITS

Filed Jan. 23, 1928  5 Sheets-Sheet 1

Inventor;
Emile Savy,
By Emil Bonnelycke
Atty.

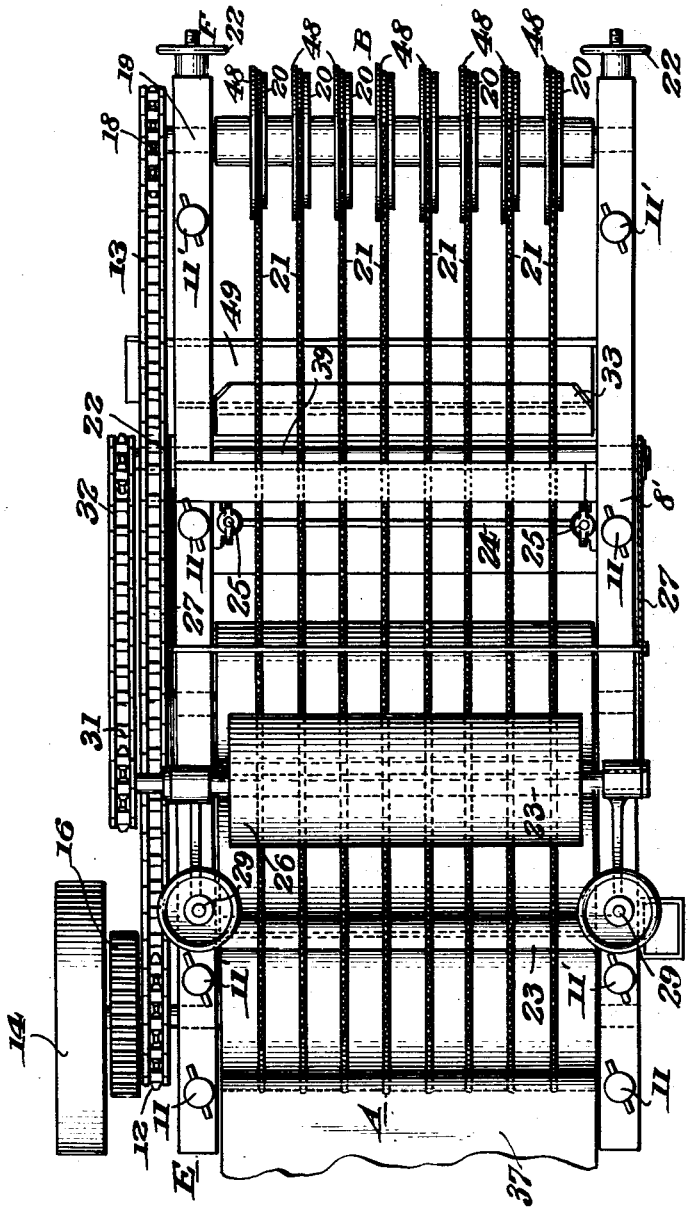

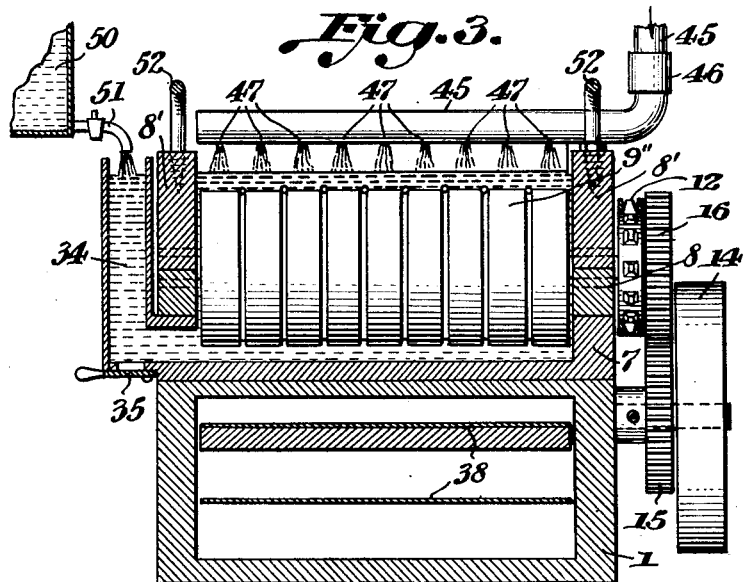
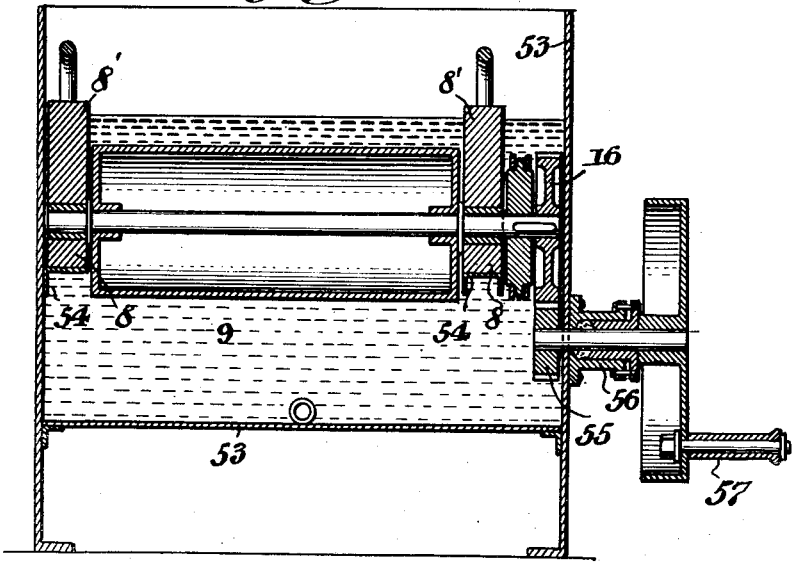

Aug. 11, 1931.  E. SAVY  1,818,911
MACHINE FOR COATING AND GLAZING BISCUITS
Filed Jan. 23, 1928  5 Sheets-Sheet 4
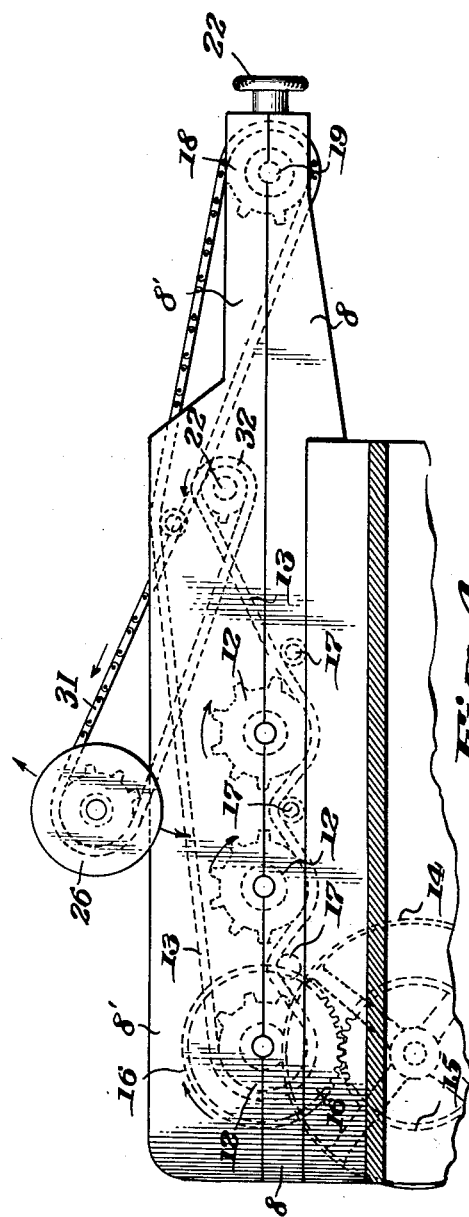
Inventor;
Emile Savy.
By Emil Bönnelycke
Atty.

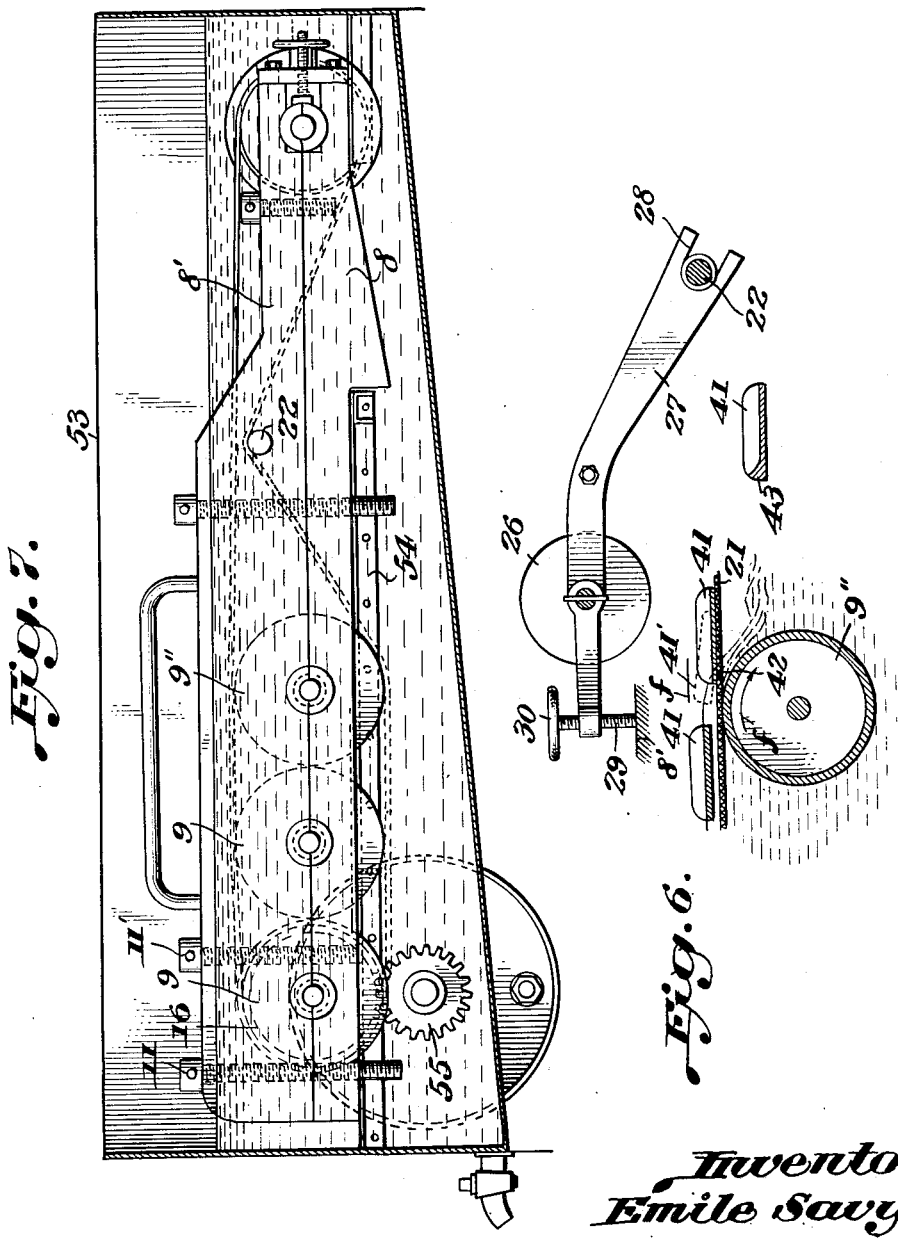

Patented Aug. 11, 1931

1,818,911

UNITED STATES PATENT OFFICE

EMILE SAVY, OF PARIS, FRANCE

MACHINE FOR COATING AND GLAZING BISCUITS

Application filed January 23, 1928, Serial No. 248,925, and in France January 25, 1927.

The object of my invention is to provide a machine for glazing or coating sweetmeats or biscuits in a bath of coating material of variable thickness, said coating being applied either superficially as a mere surface layer, or to a depth that may reach several centimeters, while requiring only a much reduced volume of glazing or coating material, a highly important feature when the quality or the colour of said material has to be changed frequently in the course of operation.

A machine according to my invention is partly constituted by already known elements but also comprises a number of new features characteristic thereof.

I have illustrated, as an example, an embodiment of such a machine in the accompanying drawings wherein:

Figure 2 is a top plan view thereof.

Figure 3 is a cross-section of the same taken along line C—D of Figure 1.

Figure 4 is a longitudinal section taken along line E—F of Figure 2.

Figures 5 and 6 are detail views.

Figure 1:
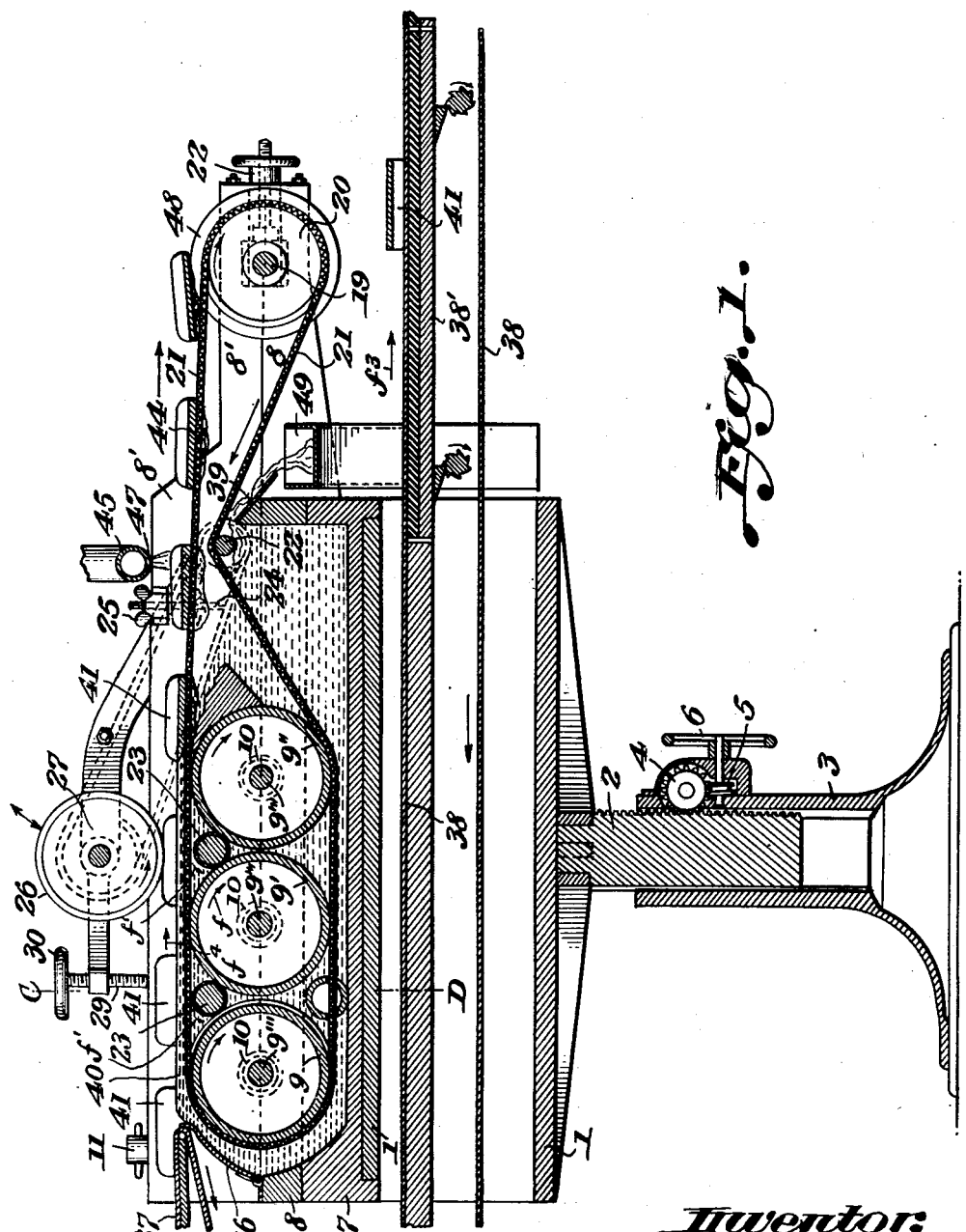
Figure 1 is a longitudinal vertical sectional view of the machine taken along line A—B of Figure 2.

Figures 7 and 8 respectively are a longitudinal section and a cross-section of a device for cleaning the machine.

Figures 9 and 10 illustrate, in order to fix ideas, two kinds of biscuit coatings obtainable with the machine.

The improved machine comprises a frame 1 in the form of a cage supported on a pillar 2 adapted to slide vertically in a stand 3, its movement being controlled by any suitable means, as, for instance, a rack on said pillar operated by a wheel 4, a worm 5 and a handwheel 6.

Frame 1 carries a basin or tank 7 made of inoxidizable metal, preferably of aluminium to minimize weight. Said basin 7 is topped with a raised or extension frame made of two portions 8—8', which increases the volume thereof and, in its turn, carries three hollow cylinders 9—9'—9", the cylinder 9" having associated with it an inclined frame or guide 33 (Figures 1 and 5) which bears tangentially against it and which may be either stationary or adjustable. Said cylinders, made of inoxidizable metal, are, in principle, constituted by tubes, this in order to minimize their weight. The spindles 9''' of these cylinders rotate in bearings 10 clamped between the two portions 8—8' of the aforementioned raised frame, assembling being effected by means of screws 11—11' (Fig. 2). The number of said cylinders is not necessarily limited to three but varies according to the size of the machine and to the sort of articles to be glazed or coated.

Sprocket pinions 12 (Figure 4), keyed on spindles 9''' and driven by chain 13, impart to cylinders 9, 9', 9" a rotary motion in the direction indicated by arrows $f$, said chain being driven by a pulley 14 and gears 15 and 16 (Figures 3 and 4). Rollers 17 (Figure 4) maintain sufficiently taut the chain which next passes around a sprocket pinion 18 keyed on a shaft 19 that is thereby driven in the same direction as cylinders 9, 9', 9". On said shaft 19 are keyed a plurality of small grooved pulleys 20, spaced about 10 mm., and the grooves of which register with grooves of the same size provided on cylinders 9, 9', 9". The various sets of grooves are connected by fine springs 21 preferably made of inoxidizable metal; the diameter of said springs being about 1 mm. The return stretches of said springs are directed upward by a transverse guide spindle 22 so as to permit them to enter into basin 7 (Figure 1).

The set of springs 21 constitutes a conveyor for the coated articles. It should be noted that this method of constructing a conveyor by means of separate strands has long been known, but only by using threads (silk or cotton), or even flexible wires, necessitating individual tensioning, a cause of many and serious troubles. The substitution of helically-coiled springs for such threads or wires does away with individual tensioning, permitting to be used a single clog-proof tensioning device common to all the springs and which consists of a pair of sleeves 22' for adjusting the position of the shaft 19 whereon the pulleys 20 are mounted.

Springs 21 are very strong and will stand frequent boiling water washings without having to be taken down.

Small free rollers 23 rest by gravity between cylinders 9, 9', 9'' which frictionally rotate them in a direction opposite the one in which they are themselves rotating (arrow f').

A scraper 24 is adjustable vertically by means of screws 25 (Figures 1 and 2).

A smooth or fluted submerging cylinder 26 is mounted on a pair of arms 27 each provided at one end with a notch 28 (Figure 6) that straddles the guide spindle 22 and at the other end with a screw 29 that bears on frame 8', and the top part of which is fitted with a handwheel 30. By operating said handwheels 30, it is possible, therefore, to swing the cylinder 26 and its supporting arms up or down about the guide spindle 22 as an axis. A chain 31, driven by a sprocket pinion 32 keyed on spindle 22, which is itself driven by the other chain 13, imparts to cylinder 26 a rotary motion at a linear speed exactly the same as the speed of cylinders 9, 9', 9''.

A small hopper 34 (Fig. 3) has its lower part in communication with the bottom of basin 7, and a plug 35 permits said basin and hopper to be drained. An adjustable shutter 36 tightly closes the front of the basin.

A conveyor 37 automatically feeds to the machine the articles to be coated, and another conveyor 38 runs through cage 1 below basin 7 in the direction of arrow $f^3$ to discharge the coated articles.

The parts being so arranged, operation is as follows:

The basin 7 is filled with glazing material up to a level adjusted by the overflow wall 39 and the machine is then started. The glazing material, taken along by cylinders 9, 9', 9'', forms a stream or sheet 40 the thickness of which can be varied by adjusting the position of shutter 36. Said stream travels in the direction indicated by arrow f and flows down the inclined chute or guide into basin 7, forming with the conveyor spring wires 21 a very acute angle, such acuteness constituting a highly important feature as will become hereinafter apparent.

The machine being so adjusted and under way; the biscuits or other articles 41 to be coated are suitably placed on conveyor 37 which automatically deposits them on the stream of glazing material 40. If said articles are light, which is the case with biscuits, they float on the surface and are carried by the stream under the adjustable submerging cylinder 26, which cylinder performs no active duty, that is to say is lifted out of the way, when a plane surface is to be glazed, but, on the contrary, is lowered the proper amount if the coating has to be applied up to some height. The loose rollers 23, which are rotated in the reverse direction from cylinders 9, 9', 9'', and consequently, from the direction of movement of the coating stream 40, create eddies in the material immediately above them, so that the material is thereby caused to rub slightly against the bottoms of the articles, coating thus being greatly facilitated because the material is compelled to penetrate into the numerous tiny holes or recesses in the biscuits.

The articles, properly coated underneath, are fed to the level of the inclined guide or chute 33 where they leave the stream and are supported solely by the conveyor springs 21, the stream making a very acute angle with the conveyor as stated above. It should be noted that the glazing layer is of equal thickness both on the front and on the rear part (Figure 9); whereas if the inclined guide 33 were omitted (see Fig. 5) the glazing material falling back into the basin would form a bead 42 at the point where the cylinder and the conveyor wires intersect. Biscuit 41, leaving the coating stream (see arrow $F^4$, Figure 6), would immediately come to bear at its front end on conveyor 21, assuming a sloping position 41' indicated by dotted lines in said figure. The rear part of the biscuit being kept up by the coating stream, the biscuit, when just leaving the stream, would, due to its own weight, suddenly come down to horizontal position. At this moment, the stream would come to coat the rear end of the said biscuit up to a height equal or nearly equal to its thickness, thus forming an unacceptable heel 43.

Hence this guide or chute constitutes an important feature of my invention.

Continuing their travel, the biscuits have a convex layer 44 of coating material (Figure 1) applied to their lower faces which represents the amount of material with which the biscuit will be ultimately covered; the vertically adjustable scraper 24 permits this amount to be modified as desired, the surplus material removed dropping into basin 7.

A tube 45 is mounted for pivotal movement about a point 46 (Figure 3) and is provided along its lower surface with apertures 47 corresponding to the intervals existing between springs 21. Said springs being arranged closely enough to permit small size biscuits to be fed along, it sometimes happens that, being more or less thick or viscous, the glazing material will spread in a sheet joining all the springs together, which would soon clog the biscuit-overturning parts 48.

By causing an air blast to be blown under pressure into tube 45, the air jets issuing through apertures 47 will break up said sheet and also will remove any excess glazing material which the springs 21 may have taken along; of course the excess material drops into the basin 7.

Continuing their travel, the biscuits come into contact with extra-thin disks 48 attached to the aforementioned grooved pulleys 20 and of a diameter substantially less than that of the pulleys. The purpose of these disks 48, which also constitute an important characteristic of my invention, is to detach, by lifting them, the biscuits that adhere somewhat firmly to springs 21 and to permit them to be readily discharged at the moment when, taken along by said disks, they tumble upside down on to the lower conveyor 38. Said conveyor, after passing the biscuits over a vibrating plate 38', in order to finish the smoothing of the coated surface, carries them to a drying stove whereinto it discharges them on to plates in the usual way.

The inverting disks 48 are from two to three tenths of a millimeter thick and they permit the furrows left on the biscuits by the imprint of the thicker springs 21 to get closed up during the turning over operation.

Said disks also prevent light biscuits from being dragged by the return strands of the spring wires from which they are detached, and they have the further effect of furnishing said return strands with all the glazing material that accumulates on their surface and which would otherwise soon clog the whole system. In this way the return strands are enabled to carry said surplus glazing back into the basin 7, the level in which is regulated by overflow 39.

In principle, if this adjustment is properly made, there should be no overflow of material at the point 39; but if an overflow does occur, the excess glazing material will flow into and down chute 49, and can be collected in any suitable container positioned at hand.

The capacity of basin 7 having to be as reduced as possible for the reasons above set forth, the amount of glazing material corresponding to the output of the machine is kept in a reservoir 50 positioned adjacent thereto and, preferably, provided with a stirrer in order to keep the material on the move. Said material flows into hopper 34 through a simple cock 51 adapted to adjust delivery so as to maintain constant the level in the basin; but the right is reserved to regulate said delivery automatically by means of the level of the glazing material, as through a float adapted to act mechanically or electrically, which device, however, is not essential.

When an operation is completed or when it is desired to change the quality or the colour of the coating, the basin 7 is emptied through draining aperture 35, after which, by unscrewing the four screws 11 (Figures 1 and 2) the frames 8 and 8' are released and raised which, being assembled together by means of screws 11', will bodily carry the whole mechanism: rollers, wires, overturning disks, etc., except the driving pulley 14 and gear 15 which remain secured on cage 1. Handles 52 secured, for instance, to the upper frame member 8', facilitate handling.

The unit so removed from the machine is then deposited in a suitably shaped tank 53, the lower part of frame 8 resting upon angle-pieces 54 secured to the inner sides of tank 53. In this position, gear 16 meshes with a pinion 55 secured on the tank and driven by a small pulley 56 operated either by hand, by means of a crank 57, or mechanically by means of a belt. Tank 53 being filled with boiling water, it will be readily understood that an almost instant cleaning of the whole mechanism can be effected through revolving it by means of pulley 56 and of pinions 16 and 55. After a couple of minutes, the boiling water is replaced by cold water.

The set or unit having been brought back to room temperature, it is lifted bodily by means of handles 52 and refitted on basin 7 by means of screws 11, said basin having been cleaned in the meanwhile.

In this way changing the quality or the colour of the coating or glazing material requires but a few minutes.

I claim as my invention:

1. In a coating apparatus, a receptacle to contain coating material; a set of relatively-large, parallel coating cylinders therein; a skeleton feed conveyor for the articles to be coated passing around said cylinders; means for driving the cylinders; and a set of relatively-small rollers arranged between adjacent cylinders and resting gravitationally in contact with their surfaces so as to be driven frictionally by the same and thereby create eddies in the material immediately above them.

2. In a coating apparatus, a receptacle to contain coating material; a set of relatively-large, parallel coating cylinders therein; a skeleton feed conveyor for the articles to be coated comprising a set of fine endless springs passing around said cylinders and engaged in circumferential grooves therein;

means for driving the cylinders; and a set of relatively-small rollers arranged between adjacent cylinders and resting gravitationally in contact with their surfaces so as to be driven frictionally by the same and thereby create eddies in the material immediately above them.

3. Coating apparatus according to claim 1, in which the cylinders and rollers are substantially coextensive and have their axes disposed in parallel relation.

4. In a coating apparatus, a receptacle to contain coating material; a set of relatively-large, parallel coating cylinders mounted therein; means for driving said cylinders; means for feeding the articles to be coated across the tops of the cylinders while maintaining them in contact with the material; and a set of relatively-small rollers disposed below said feeding means in the spaces between adjacent cylinders and driven in the opposite direction from the same so as to create eddies in the material immediately above them.

5. Coating apparatus according to claim 4, in which the eddy-creating rollers are loose and rest by gravity in contact with the surfaces of the cylinders so as to be driven frictionally by such contact.

6. In a coating apparatus, a receptacle to contain coating material; a set of parallel coating cylinders disposed therein; skeleton feeding means for the articles to be coated extending across the tops of the cylinders and over which a stream of coating material is caused to travel; and an inclined guide associated with the last cylinder of the set and disposed below and at an extremely acute angle to the feeding means to prevent over-coating and consequent formation of heels at the rear ends of the articles.

7. In a coating apparatus, a receptacle to contain coating material; a set of parallel coating cylinders disposed therein; skeleton feeding means for the articles to be coated extending across the tops of the cylinders and over which a stream of coating material is caused to travel; and an inclined guide below the feeding means disposed tangentially to the last cylinder of the set and at an extremely acute angle to said feeding means to prevent over-coating and consequent formation of heels at the rear ends of the articles.

8. In a coating apparatus, a receptacle to contain coating material; a set of relatively-large, parallel coating cylinders therein; means for driving said cylinders; skeleton feeding means for the articles to be coated extending across the tops of the cylinders and over which a stream of coating material is caused to travel; an inclined guide associated with the last cylinder of the set and disposed below and at an acute angle to the feeding means; and a set of relatively-small rollers disposed below said feeding means in the spaces between adjacent cylinders and driven in the opposite direction from the same so as to create eddies in the material immediately above them.

9. In a coating apparatus, a receptacle to contain coating material; a set of parallel coating cylinders disposed therein; skeleton feeding means for the articles to be coated extending across the tops of the cylinders and over which a stream of coating material is caused to travel; an inclined guide associated with the last cylinder of the set and disposed below and at an extremely acute angle to the feeding means to prevent over-coating of the rear ends of the articles; and a vertically-adjustable scraper arranged below said feeding means at a point beyond said guide for removing excess coating material from the bottoms of the articles.

10. In a coating apparatus, a receptacle to contain coating material; a set of parallel coating cylinders therein arranged one in advance of another and having alining parallel circumferential grooves; a shaft external to said receptacle and disposed parallel with the axes of the cylinders; a set of pulleys fixed to said shaft in line with the rows of alining grooves; a feed conveyor for the articles to be coated comprising a set of endless springs passing around said cylinders and pulleys and engaged in said grooves, said springs being made of fine helically-coiled wires; and an extremely thin disk secured to one face of each pulley to detach the coated articles from the conveyor springs and invert them during their passage over the disks, said disks having a greater diameter than said pulleys so as to project continuously beyond the peripheries of the pulleys.

11. Coating apparatus comprising a receptacle to contain coating material; a coating cylinder therein; a pulley device external to said receptacle; a feed conveyor for the articles to be coated passing around said cylinder and pulley device; means at the delivery end of the conveyor for inverting the coated articles as they leave said conveyor; a horizontal receiving member below said conveyor and whereon the inverted articles fall; and means for moving said conveyor bodily in a vertical direction toward or from the receiving member to vary the height of the said delivery end of the conveyor above said member.

12. Coating apparatus comprising a vertically-movable, hollow cage; a receptacle to contain coating material mounted on the top of the cage for bodily vertical movement therewith; a coating cylinder in said receptacle; a pulley device external to the receptacle; a feed conveyor for the articles to be coated passing around said cylinder and pulley device; means at the delivery end of the conveyor for inverting the coated articles as they leave said conveyor; a relatively-stationary discharge conveyor extending horizontally through the cage and whereon the inverted articles fall; and means for raising or lowering the cage, receptacle and feed conveyor bodily as a unit to vary the vertical distance between the said delivery end of the feed conveyor and the discharge conveyor.

In testimony whereof I affix my signature.

EMILE SAVY.